(12) United States Patent
Sato

(10) Patent No.: US 8,769,041 B2
(45) Date of Patent: Jul. 1, 2014

(54) DOCUMENT GENERATION APPARATUS, DOCUMENT GENERATION SYSTEM, DOCUMENT UPLOAD METHOD, AND STORAGE MEDIUM

(75) Inventor: Yuichiro Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 13/157,096

(22) Filed: Jun. 9, 2011

(65) Prior Publication Data

US 2011/0320561 A1  Dec. 29, 2011

(30) Foreign Application Priority Data

Jun. 23, 2010 (JP) ................. 2010-143063

(51) Int. Cl.
  *G06F 15/16* (2006.01)
(52) U.S. Cl.
  USPC .......................... 709/217; 709/219
(58) Field of Classification Search
  USPC ........................................ 709/217
  See application file for complete search history.

(56) References Cited

U.S. PATENT DOCUMENTS

| 6,374,246 | B1 | 4/2002 | Matsuo | |
|---|---|---|---|---|
| 6,823,365 | B1 | 11/2004 | Mattis | |
| 2005/0240550 | A1 | 10/2005 | Armes | |
| 2007/0174246 | A1 | 7/2007 | Sigurdsson | |
| 2011/0307573 | A1* | 12/2011 | Lingafelt et al. | 709/217 |
| 2012/0005307 | A1* | 1/2012 | Das et al. | 709/219 |
| 2012/0047331 | A1* | 2/2012 | Meza et al. | 711/134 |

FOREIGN PATENT DOCUMENTS

| CN | 1645395 A | 7/2005 |
|---|---|---|
| JP | 09-167129 A | 6/1997 |
| JP | 9-167129 A | 6/1997 |

* cited by examiner

*Primary Examiner* — Shaq Taha
(74) *Attorney, Agent, or Firm* — Canon USA, Inc., IP Division

(57) ABSTRACT

A document generation apparatus includes a determination unit, an upload unit, and a transmission unit to generate a document and upload the generated document to an external service via a network. The determination unit determines whether a document generated according to a document generation request from a client apparatus can be uploaded to the external service. The upload unit uploads the document to the external service, if the determination unit determines that the document can be uploaded to the external service. The transmission unit transmits, to the client apparatus, the document and information for uploading the document from the client apparatus to the external service, if the determination unit determines that the document cannot be uploaded to the external service.

14 Claims, 15 Drawing Sheets

DOCUMENT GENERATION APPARATUS, DOCUMENT GENERATION SYSTEM, DOCUMENT UPLOAD METHOD, AND STORAGE MEDIUM

BACKGROUND OF THE INVENTION

1. Field of the Invention

The present invention relates to a document generation apparatus, a document generation system, a document upload method, and a storage medium.

2. Description of the Related Art

In recent years, cloud computing systems have started to be widely used as an architecture in which a server computer side manages business data and performs various types of processing. In this system, a user accesses a web page of a cloud server computer from a browser of a client computer via the Internet, and displays business data that the user wants to view on the web page. When the user issues a document generation instruction from the screen or the like showing the business data, the cloud server computer redirects the instruction to a document generation server.

Then, the user selects a form to be used in form overlay processing on the screen returned by the document generation server to be displayed on the browser of the client computer. When the user selects a form, the document generation server acquires data stored in the cloud server to generate a document, and downloads the document to the browser or uploads the document to the cloud server.

In such a system, the document generation server needs to process requests from a large number of client computers simultaneously. As a method for uploading a large number of documents to the cloud server simultaneously, there is a known technique for, when the number of connections to be processed exceeds the remaining number of acceptable connections, waiting for a retry interval time and repeating the upload processing until the retry count exceeds the maximum allowable number therefor or the processing is completed (refer to Japanese Patent Application Laid-Open No. 9-167129).

In the cloud platform service, a data transmission method for uploading a file is specified, and for some services a method may be specified which requires a large amount of memory for the file upload processing. For example, encoding based on the Base 64 method requires a memory amount equal to or more than a size of a file to be generated due to its algorithm.

However, if the document generation server, which uploads a file to the cloud platform service, is provided as a cloud service, the document generation server may receive a large number of accesses simultaneously. Therefore, there is an issue in a thus-configured system that, due to a limited amount of resources (memory amount) of the document generation server, concurrent execution of data upload processes to the cloud platform service may result in heavy consumption of the memory and deterioration of the performance of the document generation service as a whole.

SUMMARY OF THE INVENTION

According to an aspect of the present invention, a document generation apparatus capable of generating a document and uploading the generated document to an external service via a network includes a determination unit configured to determine whether a document generated according to a document generation request from a client apparatus can be uploaded to the external service, an upload unit configured to upload the document to the external service, if the determination unit determines that the document can be uploaded to the external service, and a transmission unit configured to transmit, to the client apparatus, the document and information for uploading the document from the client apparatus to the external service, if the determination unit determines that the document cannot be uploaded to the external service.

According to the present invention, it is possible to reduce a memory use amount that is used for document upload processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
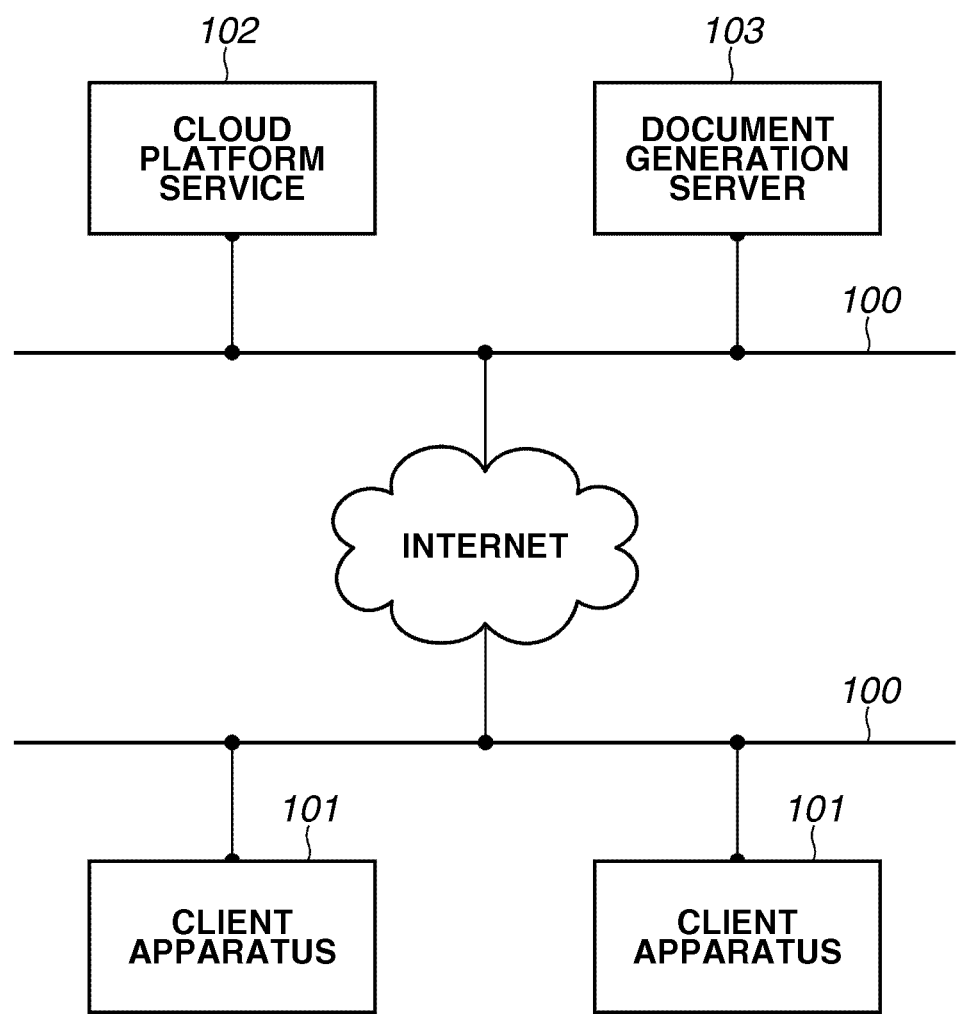
FIG. 1 illustrates an example of a system configuration of a document generation system.

FIG. 1 illustrates an example of a system configuration of a document generation system according to a first exemplary embodiment. A client apparatus 101 issues a request to a cloud platform service 102 and a document generation server 103, which are described below. The cloud platform service 102, for example, displays and updates data stored therein in response to the request from the client apparatus 101 and the document generation server 103. The document generation server 103 generates a document upon a reception of the request from the client apparatus 101.

The above-described constituent elements are communicably connected with one another via a network 100. The network 100 is embodied by, for example, any of a local area network (LAN) and a wide area network (WAN) such as the Internet, a telephone line, a dedicated digital line, an asynchronous transfer mode (ATM) line, a frame relay line, a cable television line, and a data broadcasting wireless line. Alternatively, the network 100 may be a communication network embodied by a combination of any of them.

The network 100 may be embodied by any type of network as long as the network can perform data transmission and reception. The communication means from the client apparatus 101 to the cloud platform service 102 and the document generation service 103, the communication means from the document generation server 103 to the cloud platform service 102, and the communication means between the servers may be different from one another.

Figure 2:
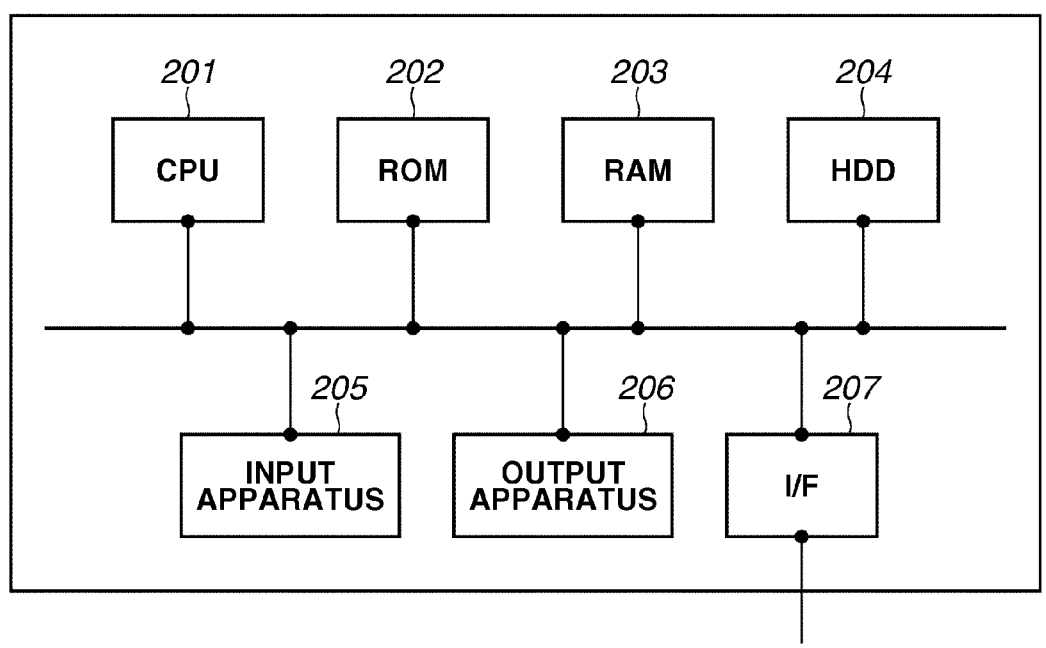
FIG. 2 illustrates an example of a hardware configuration of a client apparatus, a cloud platform service, and a document generation server illustrated in FIG. 1.

FIG. 2 illustrates an example of a hardware configuration of the client apparatus 101, the cloud platform service 102, and the document generation server 103 illustrated in FIG. 1. A central processing unit (CPU) 201 directly or indirectly controls various devices (for example, a read only memory (ROM) and a random access memory (RAM), which will be described below, and other devices) connected via an internal bus, and executes programs for realizing the present exemplary embodiment. A ROM 202 stores a basic input output system (BIOS). A RAM 203 is a direct storage apparatus which can be used as a work area for the CPU 201 or a temporary storage area to which software modules for realizing the present exemplary embodiment are loaded.

A hard disk drive (HDD) 204 is an indirect storage apparatus storing an operating system (OS), which is basic software, and the software modules. The HDD 204 may be a solid state drive (SSD), for example. An input apparatus 205 is a keyboard, a pointing device, or the like (not illustrated). A display is connected to an output apparatus 206. An interface (I/F) 207 is an interface enabling a connection to the network 100.

At these hardware devices, the BIOS is executed by the CPU 201 and the OS is loaded from the HDD 204 to the RAM 203 so as to become executable, upon a start-up of the apparatus. The CPU 201 loads various types of software modules, which will be described below, from the HDD 204 to the RAM 203 so as to become executable at an appropriate time according to an operation of the OS. The various types of software modules are executed to function by the CPU 201 in cooperation with the above-described devices. The I/F 207 is connected to the network 100, and realizes communication by the above-described communication means under the control of the CPU 201 according to an operation of the OS.

More specifically, the CPU 201 executes processing based on the programs stored in, for example, the HDD 204, so that processing according to the software modules, flowcharts, and the like, which will be described below, can be realized.

The cloud platform service 102 and the document generation server 103 may have a hardware configuration that does not include the input apparatus 205 and the output apparatus 206.

Figure 3:
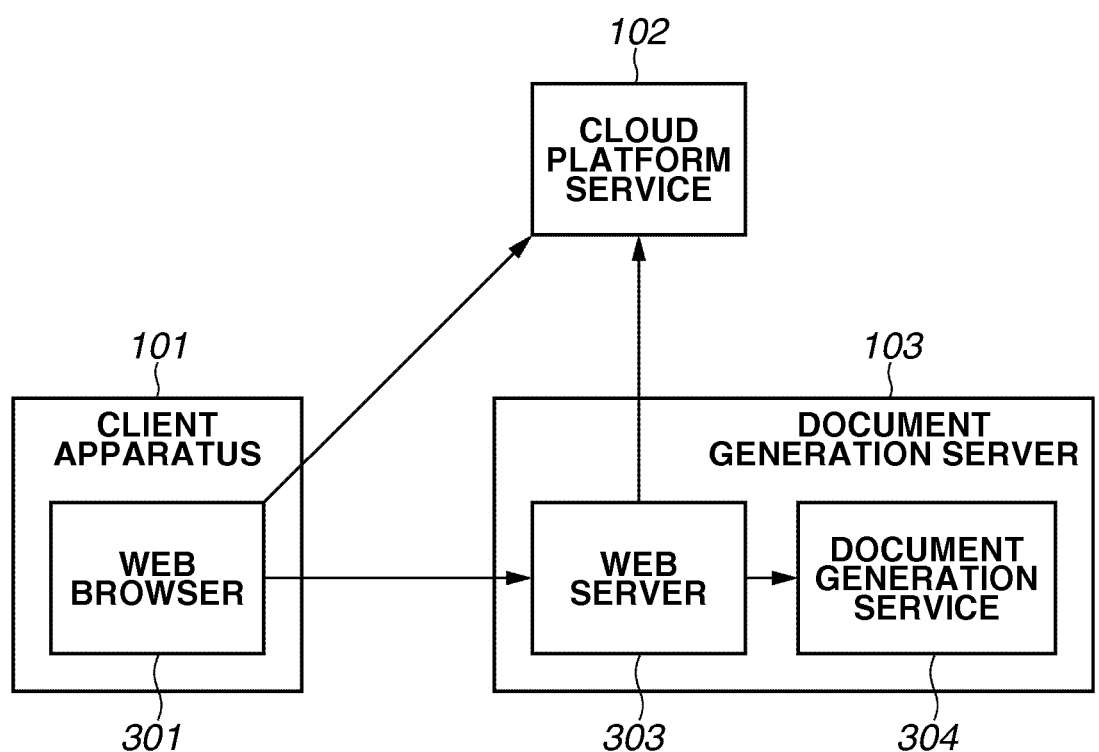
FIG. 3 illustrates an overview of a software configuration of the document generation system.

FIG. 3 illustrates an overview of a software configuration of the document generation system. The client apparatus 101 includes a web browser 301 as a user interface application. For example, the web browser 301 is an example of a document display control unit.

The cloud platform service 102 manages users who use the cloud platform service 102, business data, and settings for performing redirection to the document generation server 103, which will be described below. Further, the cloud platform service 102 is designed based on the assumption that the cloud platform service 102 is used by a plurality of companies and organizations (generally referred to as a multi-tenant architecture), and therefore is configured to provide the above-described management of the users, the business data, and the like for each company or each organization which uses the cloud platform service 102.

The document generation server 103 includes a web server 303 and a document generation service 304. The web server 303 is configured to have the functions of a so-called web application. The client apparatus 101 can access the web server 303 via the web browser 301.

The web server 303 returns user interface information in response to a request from the web browser 301. The web browser 301 renders and displays the user interface information obtained from the web server 303. Examples of the displayed user interface information include a list of forms managed by the document generation server 103 and an interface for issuing a request to generate a document, which will be described below.

Upon a reception of a document generation request from the web browser 301, the web server 303 acquires the business data from the cloud platform service 102, and transmits the document generation request together with the business data to the document generation service 304. The document generation service 304 performs overlay processing with use of the received data and a form managed by the document generation service 304 itself to generate document data.

Figure 4:
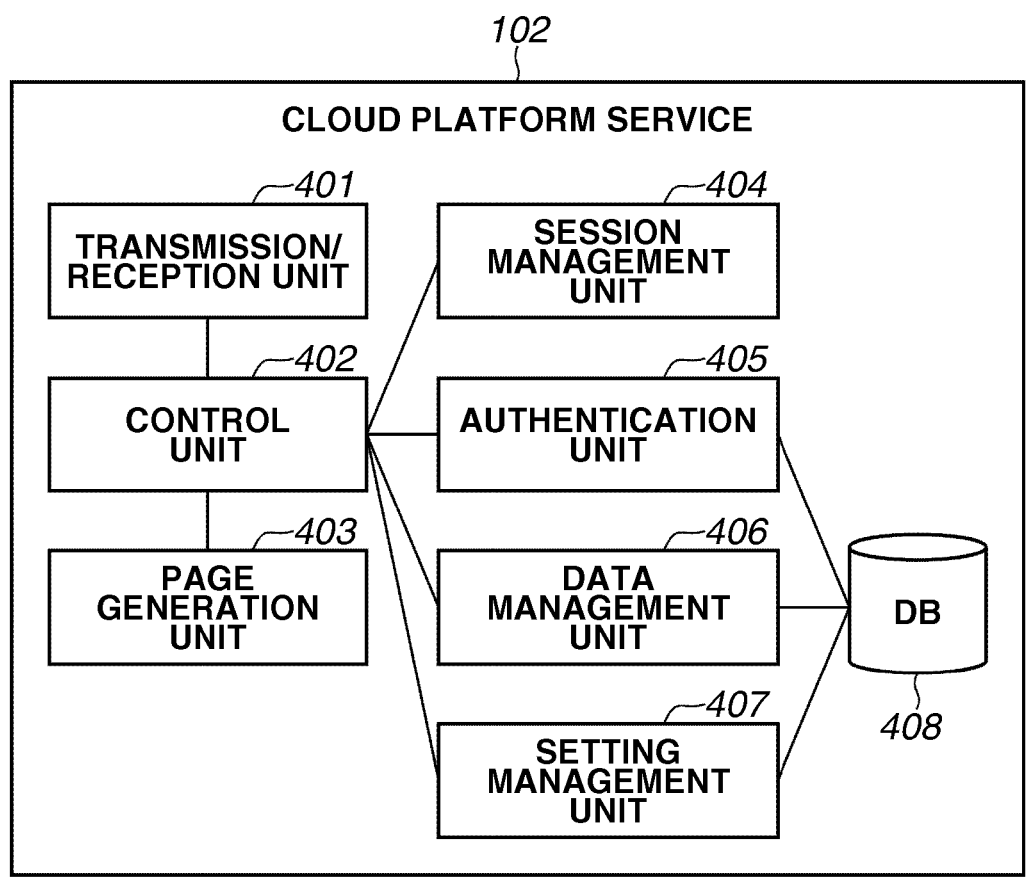
FIG. 4 illustrates an example of a configuration of software modules which operate on the cloud platform service.

FIG. 4 illustrates an example of a configuration of software modules which operate on the cloud platform service 102. Each of the software modules is stored in the HDD 204 illustrated in FIG. 2, and is executed after being loaded onto the RAM 203 by the CPU 201 as described above.

The cloud platform service 102 includes the following units. A transmission/reception unit 401 processes communication between the cloud platform service 102, and the web browser 301 of the client apparatus 101 and the web server 303 of the document generation server 103. A control unit 402 performs processing according to a request received by the transmission/reception unit 401. A page generation unit 403 generates a web page for returning a response to the web browser 301. An authentication unit 405 authenticates a user who issues a log-in request.

A session management unit 404 manages session information of a user who has succeeded in authentication by the authentication unit 405. A data management unit 406 stores business data in a database (DB) 408, and retrieves the business data from the DB 408 or updates the business data in the DB 408 according to a request. A setting management unit 407 stores the settings for performing redirection to the document generation server 103. The cloud platform service 102 performs processing which will be described below in cooperation with the respective constituent elements.

The DB 408 in FIG. 4 stores the managed user data and business data, and is stored in the HDD 204 illustrated in FIG. 2.

The managed user data and business data are managed for each company or organization (hereinafter collectively referred to as "organization"). An organization identification (ID) is automatically assigned to each organization, and each piece of data is managed together with the assigned organization ID. When the authentication unit 405 authenticates a user, the authentication unit 405 acquires the organization ID of the organization which the user belongs to, and stores it in the session management unit 404. The successive processing such as data acquisition is performed based on the organization ID, and only data corresponding to the stored organization ID can be referred.

Further, the DB 408 also stores the settings for performing redirection to the document generation server 103. The business data and the settings for performing redirection to the document generation server 103 stored in the DB 408 can be set and updated by a user (administrator) at arbitrary timing via the web browser 301.

Figure 5:
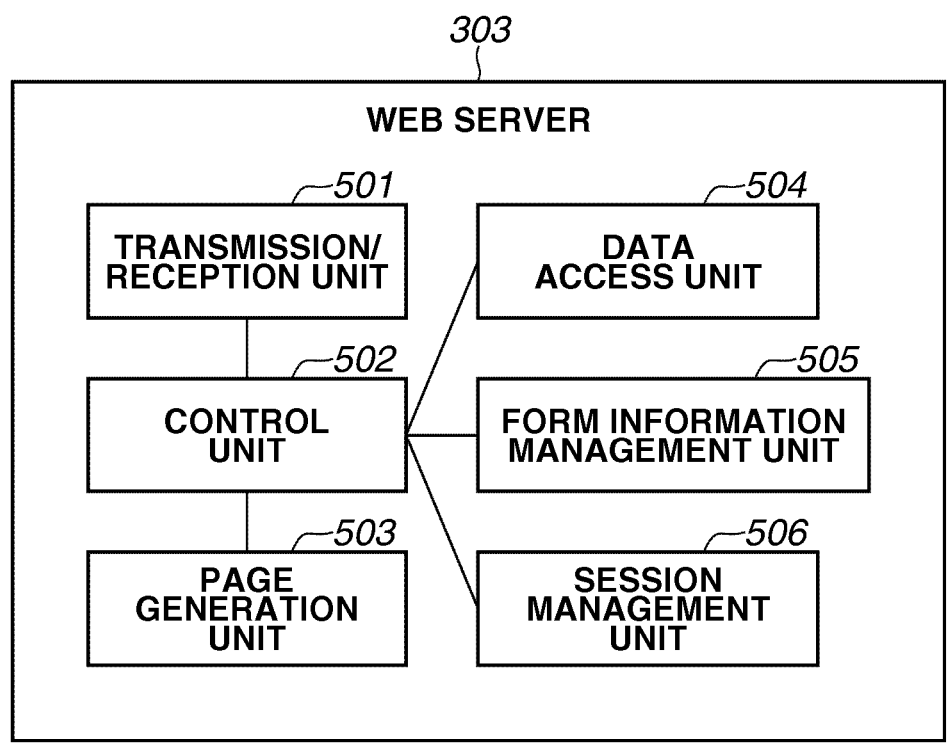
FIG. 5 illustrates an example of a configuration of software modules which operate on a web server of the document generation server.

FIG. 5 illustrates an example of a configuration of software modules which operate on the web server 303 of the document generation server 103. Each of the software modules is stored in the HDD 204 illustrated in FIG. 2, and is executed after being loaded onto the RAM 203 by the CPU 201 as described above.

The web server 303 includes the following units. A transmission/reception unit 501 processes communication between the web server 303, and the web browser 301 of the client apparatus 101, the cloud platform service 102, and the document generation service 304. A control unit 502 performs processing according to a received request. Further, the control unit 502 stores the maximum number of simultaneous uploads that can be performed from the document generation server 103 to the cloud platform service 102. The control unit 502 can switch a document upload method by comparing the maximum number of simultaneous uploads and the number of document uploads that are currently performed.

A page generation unit 503 generates a web page for returning a response to the web browser 301. A data access unit 504 accesses the cloud platform service 102 to acquire the business data. A form information management unit 505 manages a form information table which will be described below. A session management unit 506 manages session information of the web browser 301. The web server 303 performs processing which will be described below in cooperation with the respective constituent elements.

Figure 6:
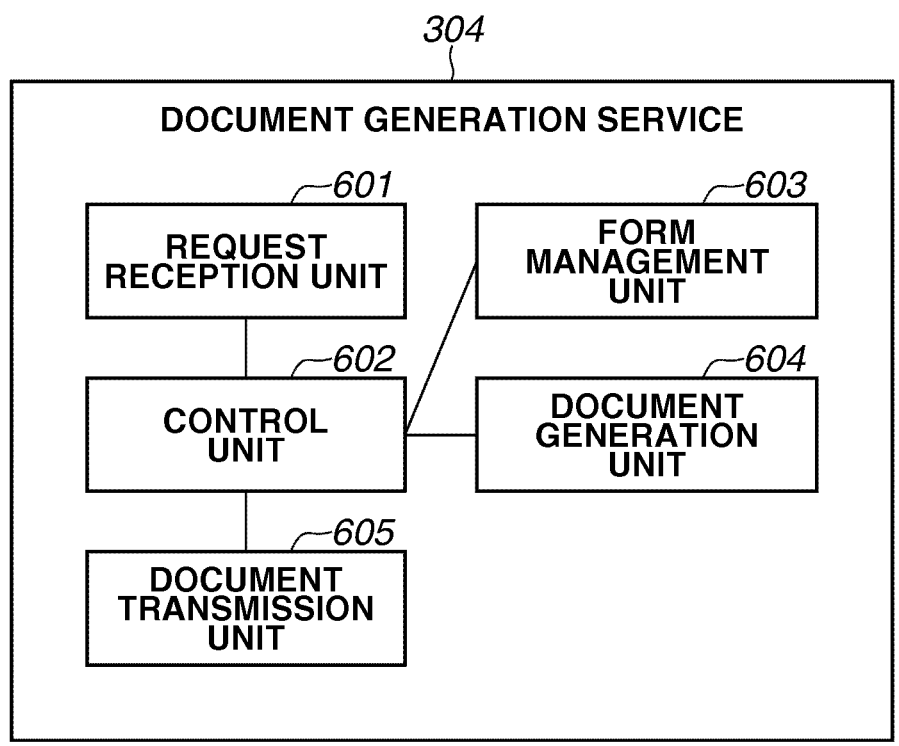
FIG. 6 illustrates an example of a configuration of software modules which operate on a document generation service of the document generation server.

FIG. 6 illustrates an example of a configuration of software modules which operate on the document generation service 304 of the document generation server 103. Each of the software modules is stored in the HDD 204 illustrated in FIG. 2, and is executed after being loaded onto the RAM 203 by the CPU 201 as described above.

The document generation service 304 includes the following units. A request reception unit 601 receives a document generation request from the web server 303. A control unit 602 performs processing according to the received request. A form management unit 603 manages form data. A document generation unit 604 performs overlay processing with use of the business data transmitted from the web server 303 and a form to generate document data. A document transmission unit 605 transmits the generated document data to the web server 303 or the client apparatus 101.

Figure 7:
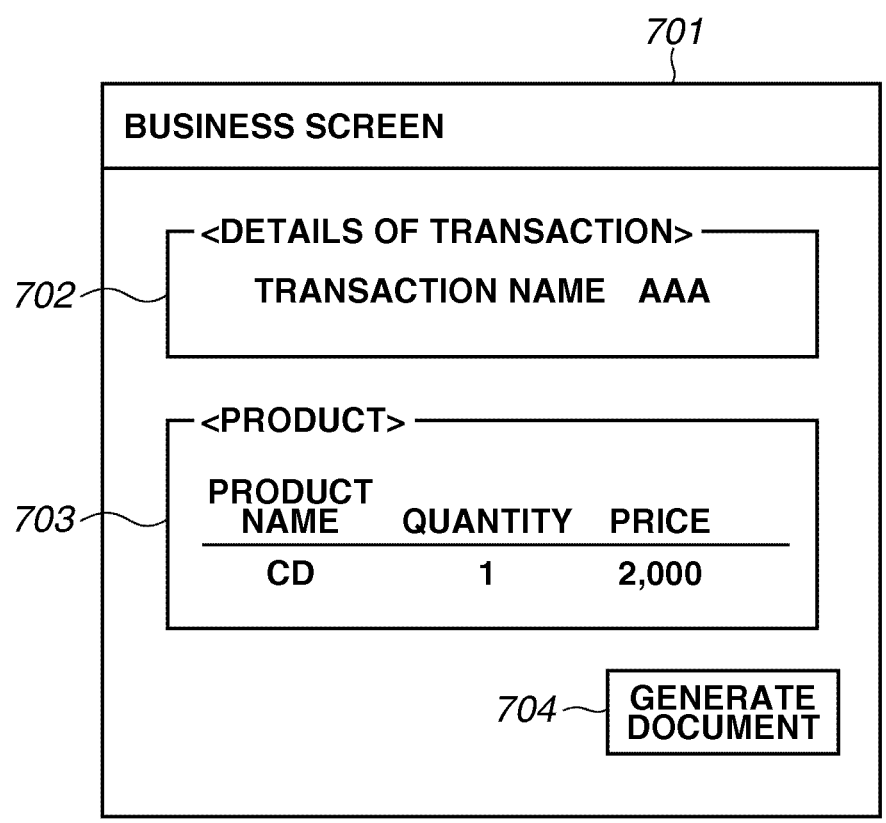
FIG. 7 illustrates an example of a business screen when a user accesses the cloud platform service from a web browser on the client apparatus to display business data thereon.

FIG. 7 illustrates an example of a business screen 701 when a user accesses from the web browser 301 of the client apparatus 101 to the cloud platform service 102 to display the business data. The business screen 701 in FIG. 7 is displayed when the user has been already logged in to the cloud platform service 102.

The business screen 701 shows detailed information 702 and a product 703 of a certain record. Referring to FIG. 7, the business screen related to transactions shows details of a transaction record. Further, the business screen 701 displays a custom button 704 to which the settings for redirection to the document generation server 103 are applied. The custom button 704 can be arbitrarily set as to, for example, what kind of operation is executed when the button is pressed and which screen the button is displayed on, and is disposed on the screen by a user (administrator).

Figure 8:
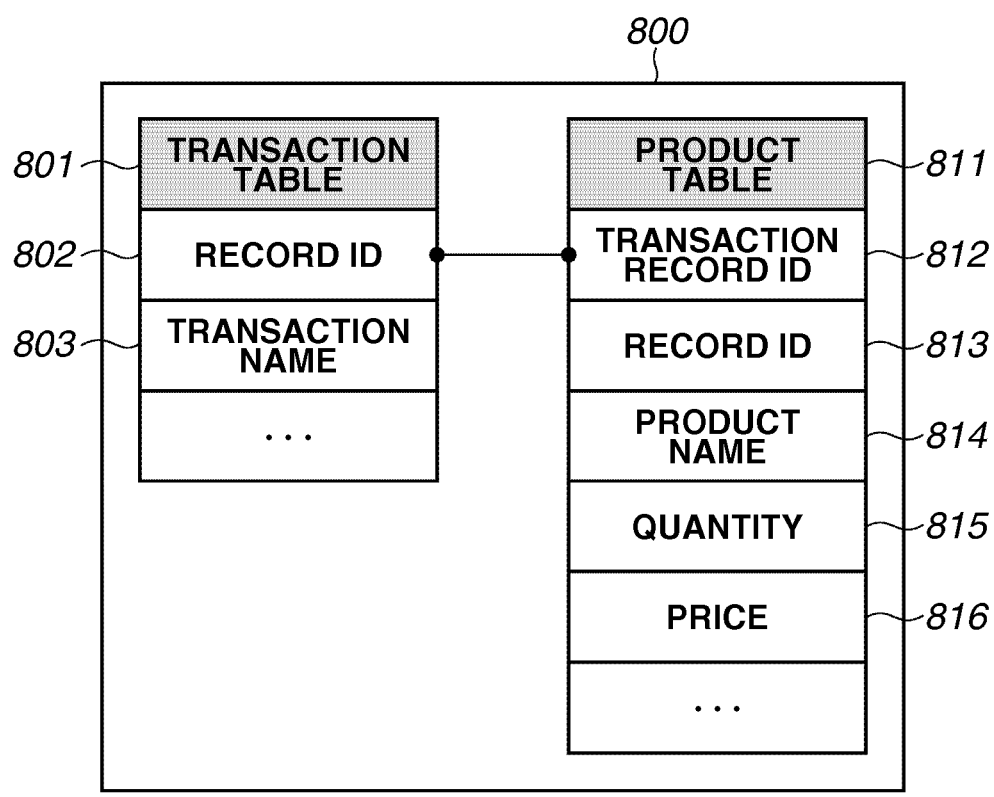
FIG. 8 illustrates an example of a table structure of transaction-related data of the business data stored in a data management unit of the cloud platform service.

FIG. 8 illustrates an example of a structure of a table containing transaction-related data of the business data pieces managed by the data management unit 406 of the cloud platform service 102. The business data is managed under a data table 800, and the data table 800 includes a transaction table 801 and a product table 811.

The transaction table 801 contains a record ID 802 which is an identifier of a record, and a transaction name 803 to which a user can set any name to make it easy for the user to recognize the record. The product table 811 contains a transaction record ID 812, a record ID 813 which is an identifier of a record in the product table 811, a product name 814, a quantity 815, and a price 816. Further, a relation is established between the transaction record ID 812 and the record ID 802 of the transaction table 801.

Figure 9:
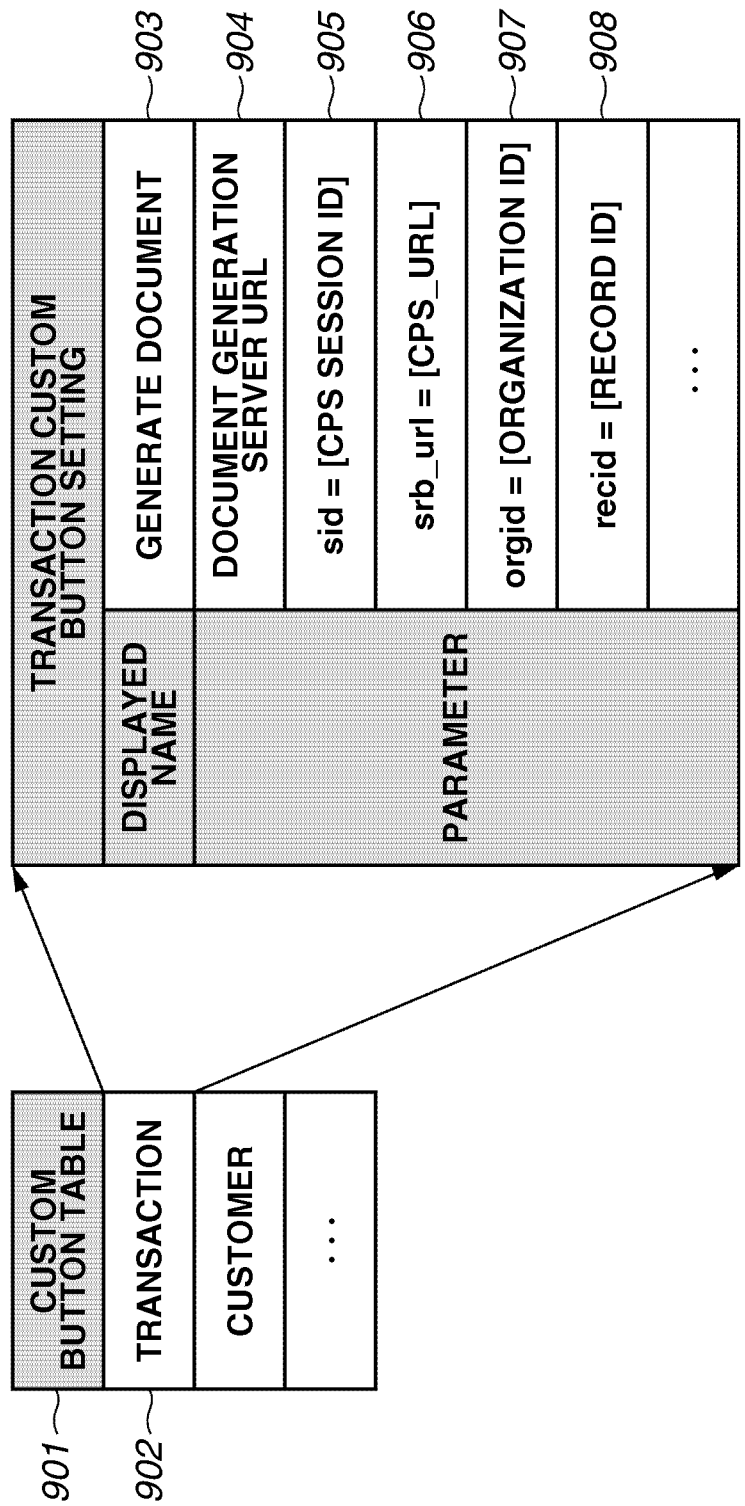
FIG. 9 illustrates an example of custom button definition information stored in a setting management unit of the cloud platform service.

FIG. 9 illustrates an example of definition information of a custom button, which is stored in a custom button table 901 in the setting management unit 408 of the cloud platform service 102. In the example illustrated in FIG. 9, a custom button is defined for a "transaction" screen and a "customer" screen. The setting information 902 about the custom button to be displayed on the "transaction" screen contains a button displayed name 903, and parameter information used for redirection to the document generation server 103.

A document generation server uniform resource identifier (URI) 904 is a parameter specifying the URI of the document generation server 103 in the form of "http:// . . . . " A session ID 905 is a setting for adding a character string "sid=<SESSION ID>" to a uniform resource locator (URL) parameter by acquiring a session ID of a user who has logged in.

A cloud platform service (CPS) URL (hereinafter referred to as "CPSURL") 906 is a setting for adding, to the URL parameter, the URL enabling the document generation server 103 to access the cloud platform service 102 as a character string "srv_url=<CLOUD PLATFORM SERVICE URL>". For example, the URL of the cloud platform service (CPSURL) is an example of redirection destination information indicating the cloud platform service.

The URL for enabling access to the cloud platform service 102 is unique to each organization. When a user is authenticated, the control unit 502 acquires the URL corresponding to the organization to which the user belongs, and stores the acquired URL in the session management unit 404.

An organization ID 907 is a setting for adding a character string "orgid=<ORGANIZATION ID>" to the URL parameter by acquiring an organization ID of the user who has logged in. A record ID 908 is a setting for adding a character string "recid=<RECORD ID>" to the URL parameter by acquiring the record ID 802 of the transaction record displayed on the screen.

Figure 10:
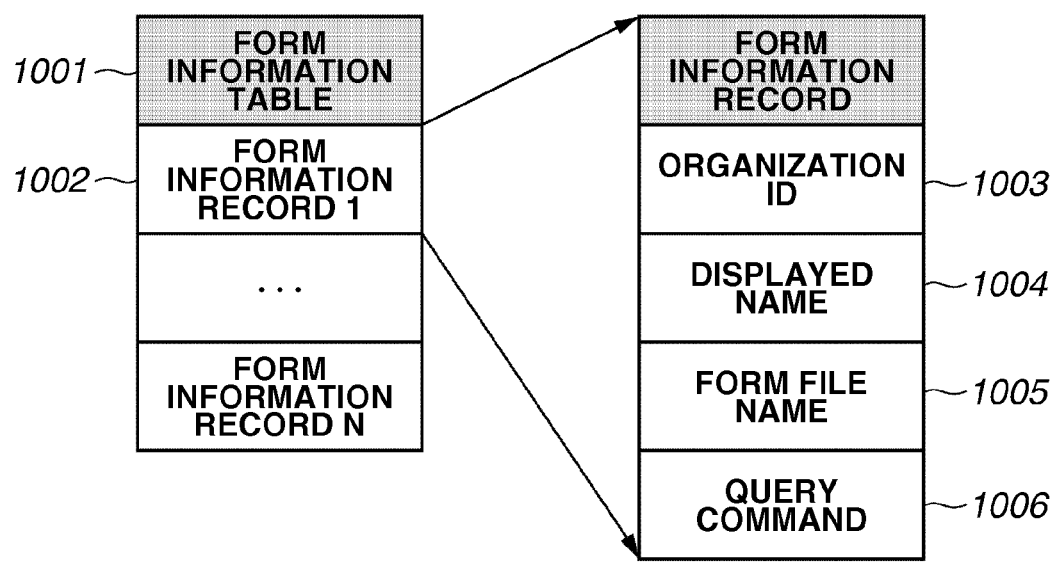
FIG. 10 illustrates an example of a table structure of a form information table stored in a form information management unit of the web server.

FIG. 10 illustrates an example of a table structure of a form information table stored in the form information management unit 505 of the web server 303. A form information record 1002 in the form information table 1001 includes the following data.

An organization ID 1003 can be used for identifying an organization which owns the form information record. A displayed name 1004 is a name to be displayed on a form selection screen. A form file name 1005 is a file name of a form managed by the form management unit 603 of the document generation service 304. A query command 1006 is a command describing a query for acquiring data from the cloud platform service 102.

Figure 11:
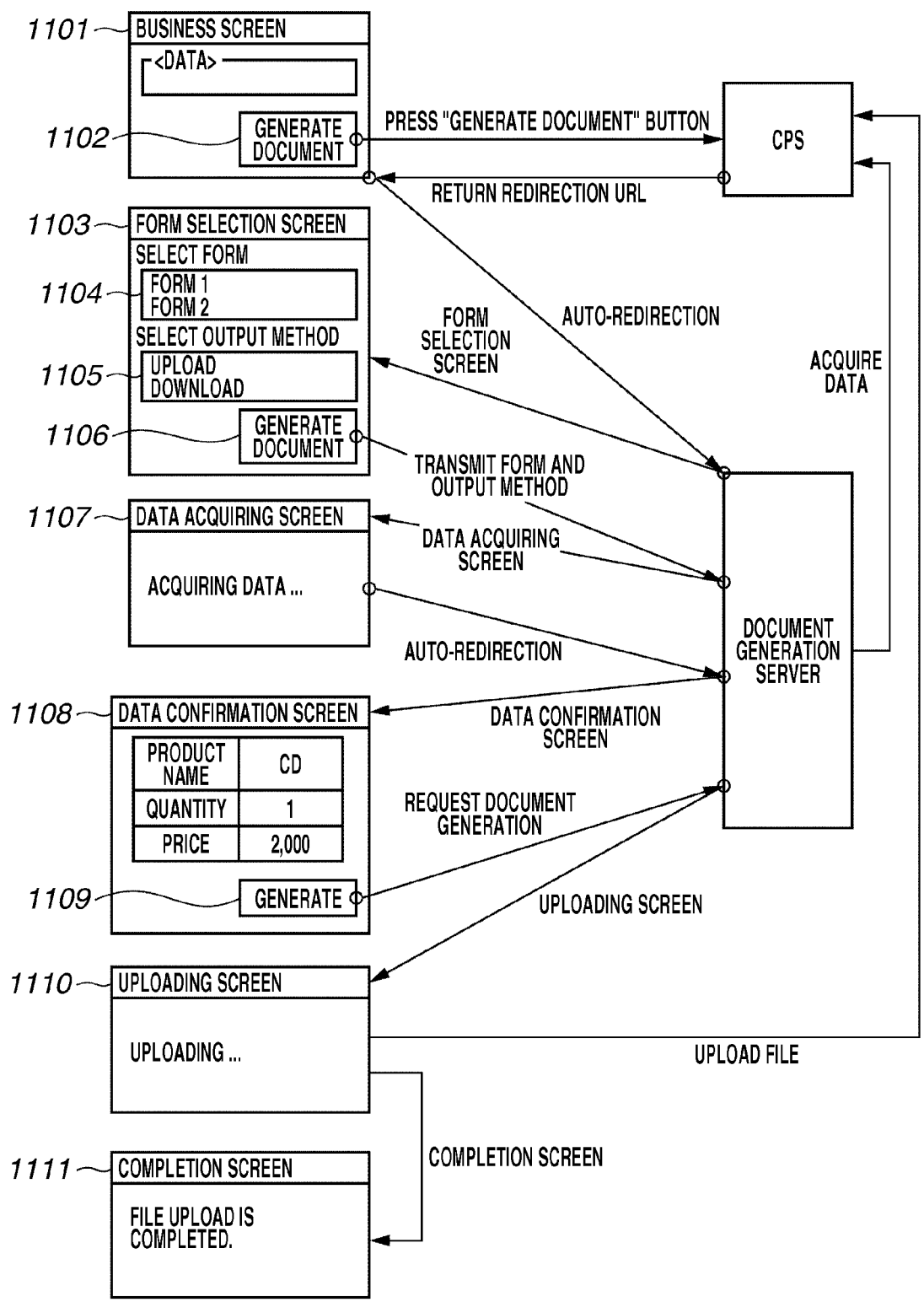
FIG. 11 illustrates an example of a transition of a screen to be displayed on the web browser of the client apparatus.

FIG. 11 illustrates an example of a transition of the screen displayed on the web browser 301 of the client apparatus 101 in the document generation system illustrated in FIG. 1. The cloud platform service is abbreviated as "CPS" in FIG. 11 and subsequent drawings.

A business screen 1101 is generated by the cloud platform service 102, and returned to the client apparatus 101. For example, the business screen 701 illustrated in FIG. 7 is displayed as the business screen 1101. A document generation button 1102 is a button for issuing a document generation request to the cloud platform service 102. The cloud platform service 102 returns the URL for redirecting the request to the document generation server 103, when a user presses the document generation button 1102.

Upon a reception of the URL for the redirection, the web browser 301 of the client apparatus 101 redirects the request to the document generation server 103 according to the received URL. Upon a reception of the request through the redirection, the document generation server 103 returns a form selection screen 1103 to the web browser 301 of the client apparatus 101.

The form selection screen 1103 includes a form option 1104 from which a user selects a form to be used in document generation. Further, the form selection screen 1103 includes an output method option 1105 for enabling the user to select whether to upload a document generated by the document generation server 103 to the cloud platform service 102, or to download the document generated by the document generation server 103 to the web browser 301 of the client apparatus 101.

Then, upon a reception of a selection of the document generation button 1106 from the user, the web browser 301 of the client apparatus 101 transmits the results selected from the form option 1104 and the output method option 1105 to the document generation server 103. After receiving these pieces of information, the document generation server 103 acquires the business data of the business screen 1101 from the cloud platform service 102. A data acquiring screen 1107 is displayed on the web browser 301 of the client apparatus 101 while the document generation server 103 is acquiring the business data from the cloud platform service 102.

When acquisition of the business data from the cloud platform service 102 is completed, the document generation server 103 returns a data confirmation screen 1108 for enabling the user to confirm the acquired data to the web browser 301 of the client apparatus 101. Upon a reception of a selection of a generation button 1109 from the user, the web browser 301 of the client apparatus 101 transmits a document generation request to the document generation server 103.

Upon a reception of the document generation request, the document generation server 103 generates a document with use of the selected form and the business data acquired from the cloud platform service 102. Then, the document generation server 103 uploads the generated document to the cloud platform service 102 or downloads the generated document to the web browser 301 of the client apparatus 101 according to the selected output method.

If the selected output method is the upload, the document generation server 103 acquires the number of uploads that are currently being performed. If the number of uploads that are currently being performed is equal to the maximum number of uploads that can be simultaneously performed, the document generation server 103 returns the URL for redirection to the cloud platform service 102, the document, an upload program, an uploading screen 1110, and a completion screen 1111 to the client apparatus 101.

The web browser 301 of the client apparatus 101 displays the uploading screen 1110, and uploads the received document to the cloud platform service 102 using the URL, which is a redirection destination, and the upload program. Upon completion of the upload of the document, the web browser 301 of the client apparatus 101 displays the completion screen 1111.

Figure 12:
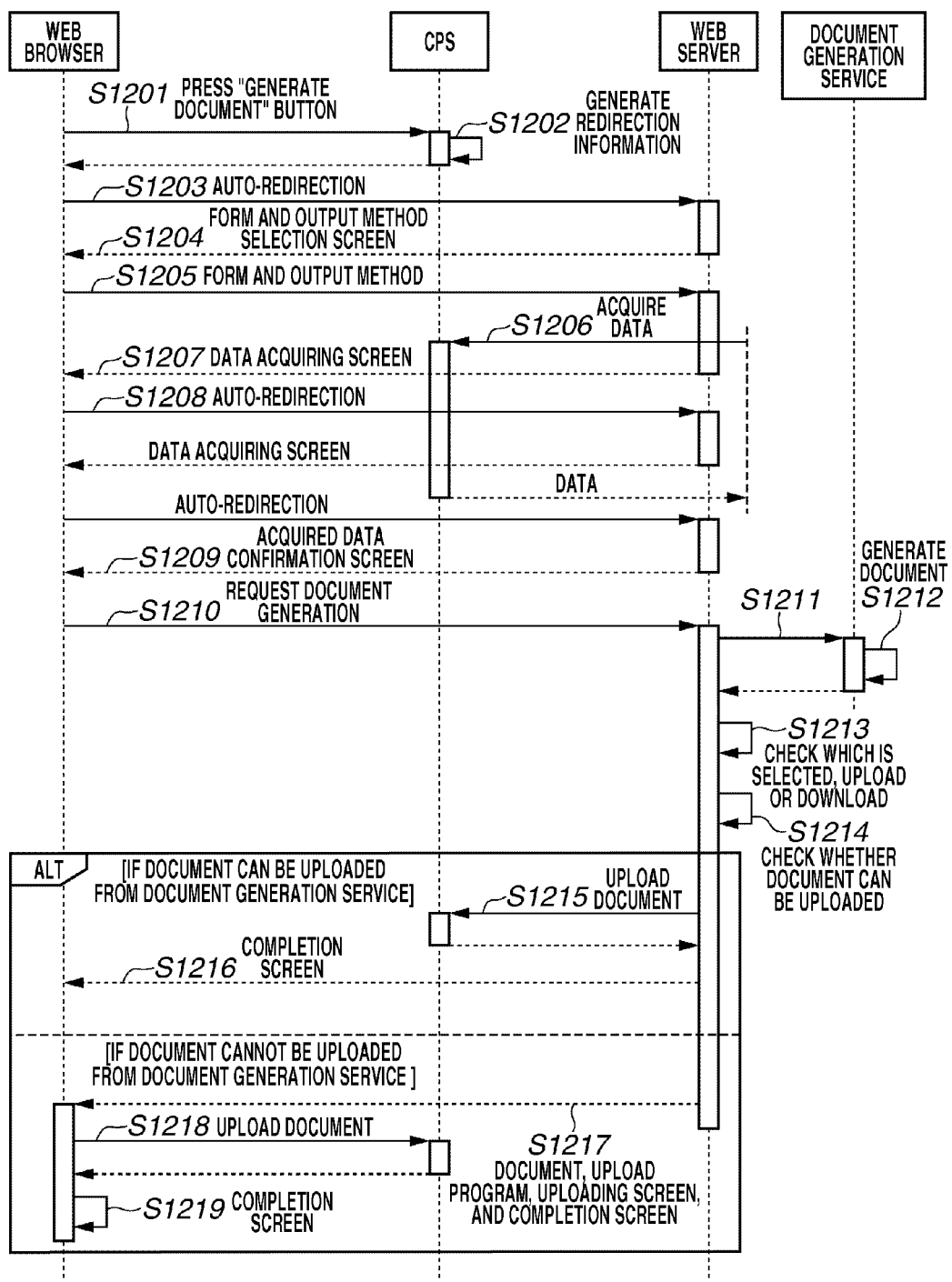
FIG. 12 illustrates an example of processing performed by the document generation system.

FIG. 12 illustrates an example of the processing performed by the document generation system. At this point, it is assumed that the user has logged in to the cloud platform service 102 using a login screen (not illustrated), the business screen 701 illustrated in FIG. 7 is currently displayed on the web browser 301, and the settings illustrated in FIG. 9 are applied to the custom button 704 in advance.

First, in step S1201, the user presses the custom button 704 on the business screen 701 displayed on the web browser 301 of the client apparatus 101. Then, in step S1202, the cloud platform service 102 generates a redirection URL.

More specifically, in step S1202, the control unit 402 acquires the document generation server URL 904, the session ID 905, the CPSURL 906, the organization ID 907, and the record ID 908 set to the custom button 704, and generates the redirection URL from these acquired parameters. Then, the control unit 402 returns a response leading to redirection to the web browser 301.

In step S1203, upon a reception of the response returned from the cloud platform service 102, the web browser 301 transmits the session ID 905, the CPSURL 906, the organization ID 907, and the record ID 908 to the document generation server 103.

In step S1204, the web server 303 receives the redirection from the web browser 301. Then, first, the control unit 502 stores the session ID 905, the CPSURL 906, the organization ID 907, and the record ID 908 in the session management unit 506.

Next, the control unit 502 acquires a list of the form displayed names 1004 included in the form information records 1002 from the form information management unit 505, and generates the form selection screen 1103 from the list of the form displayed names 1004 to transmit the form selection screen 1103 to the client apparatus 101.

In step S1205, the user selects a form from the form options 1104 and an output method from the output method options 1105 on the form selection screen 1103, and presses the document generation button 1106. Then, the web browser 301 transmits a document generation request together with the selected form and the selected output method to the web server 303.

In step S1206, when the web server 303 receives the document generation request, the document generation server 103 issues the query command 1006 corresponding to the form selected from the form options 1104, and issues a data acquisition request to the cloud platform service 102. At this time, for the URL of the cloud platform service 102 and the content of the data to be acquired, the document generation server 103 uses the CPSURL 906, the organization ID 907, and the record ID 908 stored in the session management unit 506, respectively.

Next, in step S1207, the cloud platform service 102 generates the data acquiring screen 1107, and transmits it to the web browser 301.

In step S1208, the web browser 301 regularly transmits a data acquisition completion confirmation request to the document generation server 103. The web server 303 of the document generation server 103 transmits the data acquiring screen 1107 same as the one transmitted in step S1207 to the web browser 301 until the web server 303 receives a data acquisition response from the cloud platform service 102.

Next, the cloud platform service 102 returns the data acquisition response to the document generation server 103.

The control unit 502 of the web server 303 stores the acquired data in the session management unit 506. After that, when a confirmation request of data acquisition completion is transmitted from the web browser 301, in step S1209, the web server 303 generates the data confirmation screen 1108 from the data acquired from the cloud platform service 102, and then returns the data confirmation screen 1108 to the web browser 301.

In step S1210, when the user presses the generation button 1109 on the data confirmation screen 1108 which is returned to the web browser 301 in step S1209, the web browser 301 transmits the document generation request to the web server 303. When the web server 303 receives the document generation request in step S1210, the web server 303 performs the document generation processing which will be described below.

Figure 13:
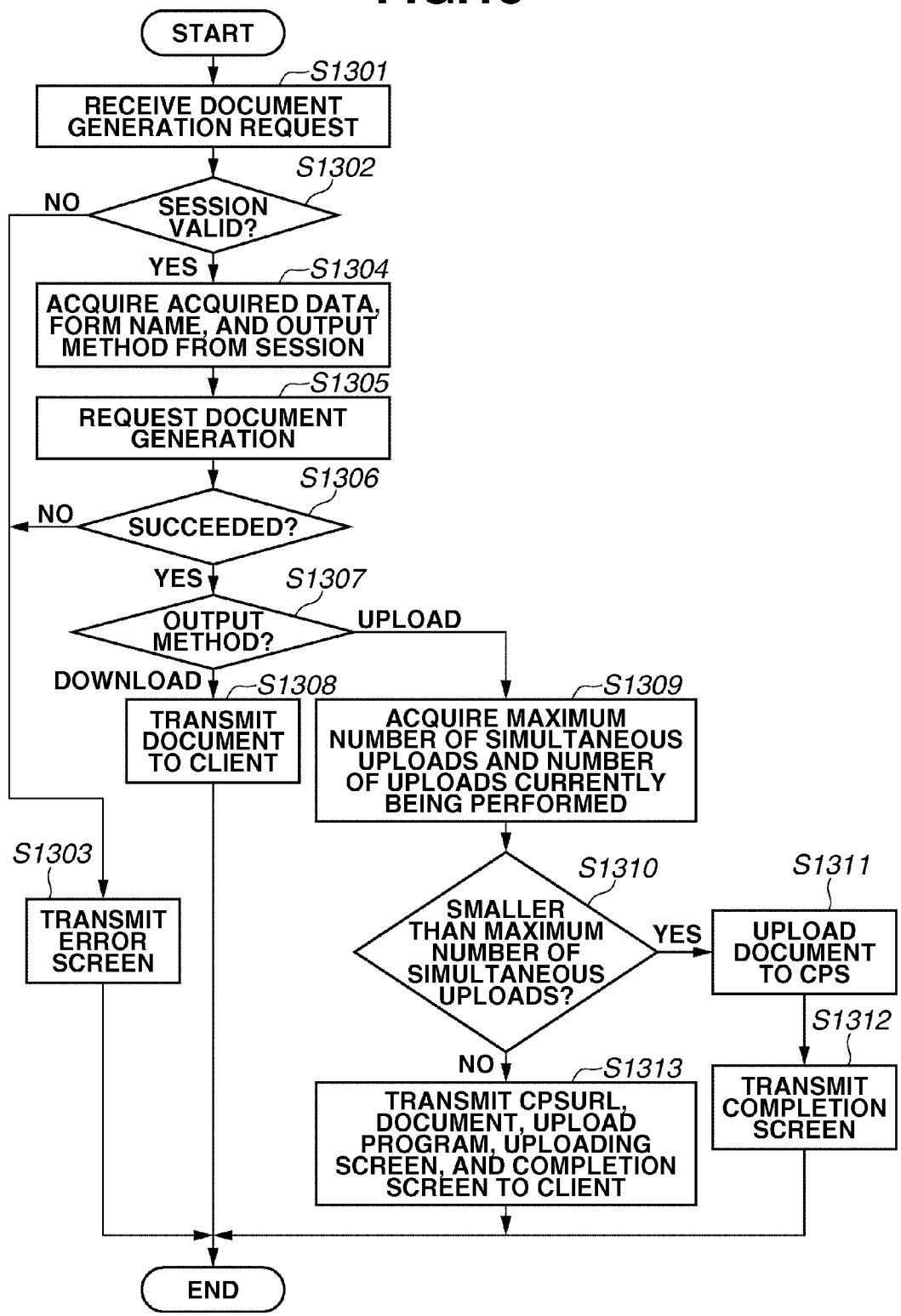
FIG. 13 is a flowchart illustrating an example of document generation processing performed by the web server according to a first exemplary embodiment, which corresponds to steps S1210 to S1217 illustrated in FIG. 12.

FIG. 13 is a flowchart illustrating an example of the document generation processing performed by the web server 303 according to the first exemplary embodiment, which corresponds to steps S1210 to S1217 illustrated in FIG. 12.

In step S1301, the control unit 502 receives the document generation request from the web browser 301. Then, in step S1302, the control unit 502 determines whether the session is valid via the session management unit 506.

If the control unit 502 determines that the session is valid (YES in step S1302), then in step S1304, the control unit 502 acquires the acquired data, the form file name 1005, and the output method from the session management unit 506.

In step S1305, the control unit 502 issues the document generation request together with the above-described acquired data and form file name 1005 to the document generation service 304 (step S1211 in FIG. 12).

In step S1306, the control unit 502 acquires a response from the document generation service 304 (step S1212 in FIG. 12), and determines whether the document generation is successful. If the control unit 502 determines that the document generation is successful (YES in step S1306), then in step S1307, the control unit 502 determines the value of the above-described output method.

In step S1307, if the control unit 502 determines that download is specified as the output method (DOWNLOAD in step S1307), the processing proceeds to step S1308. In step S1308, the control unit 502 acquires the document included in the response from the document generation service 304, and transmits the document to the web browser 301.

On the other hand, if upload is specified as the output method (UPLOAD in step S1307), the processing proceeds to step S1309. In step S1309, the control unit 502 acquires the maximum number of uploads that can be performed simultaneously from the document generation server 103 to the cloud platform service 102, and the number of uploads that are currently being performed (step S1213 in FIG. 12).

In step S1310, the control unit 502 determines whether the generated document can be uploaded to the cloud platform service 102. More specifically, the control unit 502 determines whether the number of uploads that are currently being performed is smaller than the maximum number of uploads that can be performed simultaneously (step S1214 in FIG. 12).

If the number of uploads that are currently being performed is equal to the maximum number of simultaneous uploads (NO in step S1310), then in step S1313, the control unit 502 acquires the following data. More specifically, the control unit 502 acquires the document included in the response from the document generation service 304, the CPSURL 906, the uploading screen 1110, and the completion screen 1111.

Further, the control unit 502 generates an upload program for enabling the web browser 301 to upload the document to the cloud platform service 102. The CPSURL 906 and the thus generated upload program are embedded in the uploading screen 1110 as a program written in JavaScript interpretable and executable by the web browser 301.

Then, the control unit 502 transmits the document included in the response from the document generation service 304, the CPSURL 906, the uploading screen 1110, the completion screen 1111, and the upload program to the web browser 301 (step S1217 in FIG. 12).

On the other hand, if the control unit 502 determines in step S1310 that the number of simultaneous uploads that are currently being performed is smaller than the maximum number of simultaneous uploads (YES in step S1310), the control unit 502 performs the processing in step S1311. In step S1311, the control unit 502 acquires the document included in the response from the document generation service 304, and uploads the document to the cloud platform service 102 (step S1215 in FIG. 12).

In step S1312, when a response indicating upload completion from the cloud platform service 102 is received, the control unit 502 requests the page generation unit 503 to generate the completion screen 1111. The page generation unit 503 generates the completion screen 1111, and the control unit 502 transmits the completion screen 1111 to the web browser 301 (step S1216 in FIG. 12).

If the control unit 502 determines in step S1302 that the session is not valid (NO in step S1302), or if the control unit 502 determines in step S1306 that the document generation is unsuccessful (NO in step S1306), then in step S1303, the control unit 502 requests the page generation unit 503 to generate an error screen. In step S1303, the page generation unit 503 generates an error screen, and the control unit 502 transmits the error screen to the web browser 301. According to the above-described processing, the web server 303 performs the document generation processing.

The document generation processing (overlay processing using a form) performed by the document generation service 304 of the document generation server 103 is conventionally known, and therefore the description thereof will be omitted in the present exemplary embodiment.

In the document generation processing according to the present exemplary embodiment, the web server 303 returns a response to the web browser 301 after the document generation service 304 completes the document generation processing. However, similarly to the data acquisition processing, the web server 303 may first return a screen indicating that a document is currently being generated to the web browser 301 so as to cause the web browser 301 to perform auto-redirection.

Further, in the document generation processing according to the present exemplary embodiment, the control unit 502 stores the maximum number of uploads that can be performed simultaneously from the document generation server 103 to the cloud platform service 102, and switches the document upload method by comparing the maximum number of simultaneous uploads with the number of uploads that are currently being performed.

However, the present invention may employ any method capable of providing the effects of the present exemplary embodiment, such as switching the document upload method based on not only the number of uploads that are currently being performed, but also comparison whether an free memory amount of the document generation server 103 is equal to or greater than a threshold value provided to the control unit 502.

In this case, the control unit 502 compares the free memory amount of the document generation server 103 with the threshold value, and determines that the generated document can be uploaded to the cloud platform service 102 if the free memory amount is equal to or greater than the threshold value. On the other hand, the control unit 502 determines that the generated document cannot be uploaded to the cloud platform service 102 if the free memory amount is smaller than the threshold value.

Figure 14:
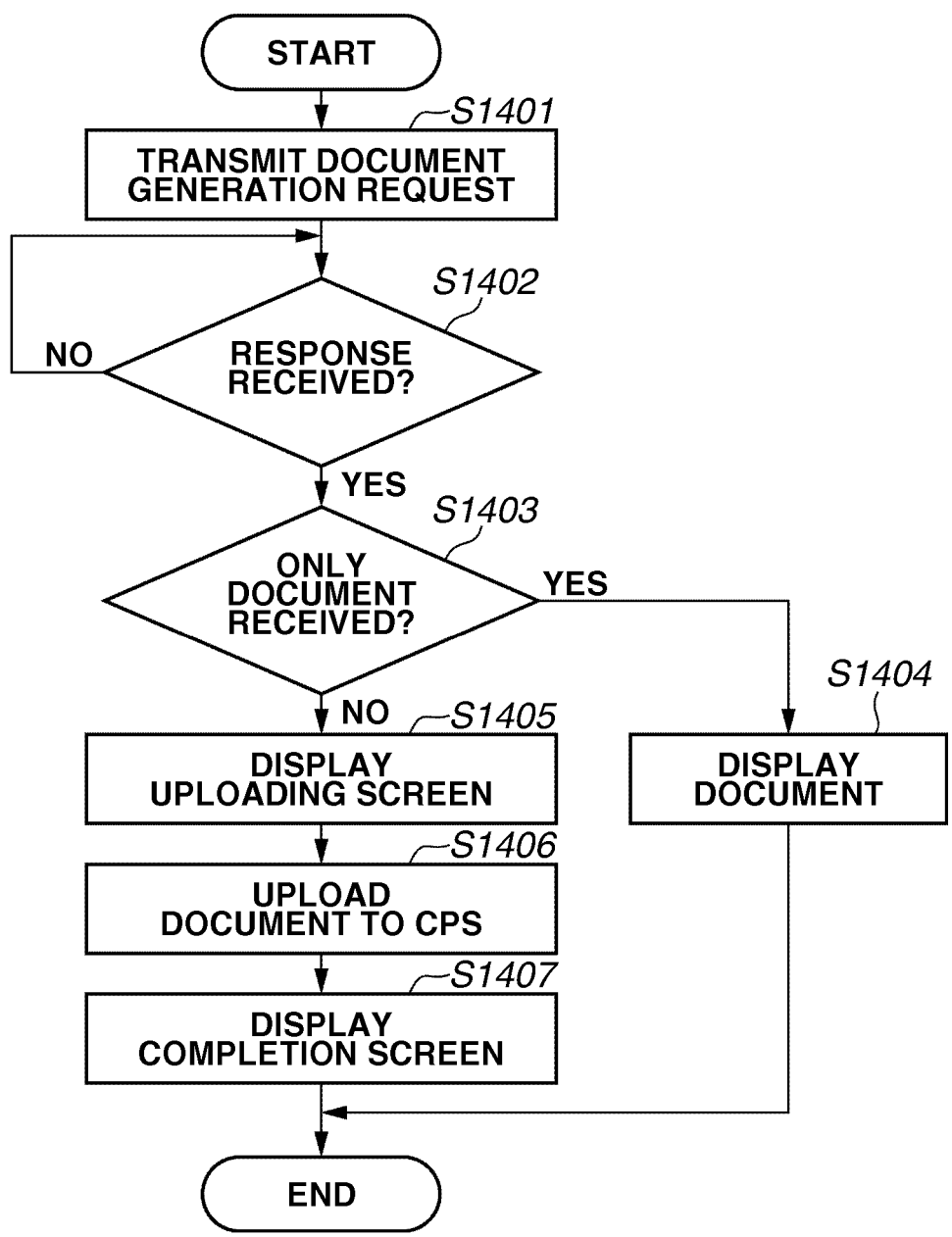
FIG. 14 is a flowchart illustrating an example of document upload processing performed by the web browser, which corresponds to steps S1210 to S1219 illustrated in FIG. 12.

FIG. 14 is a flowchart illustrating an example of the document upload processing performed by the web browser 301, which corresponds to steps S1210 to S1219 illustrated in FIG. 12.

In step S1401, when the user presses the generation button 1109 included in the data confirmation screen 1108, the web browser 301 transmits the document generation request to the web server 303 (step S1210 in FIG. 12).

Next, in step S1402, the web browser 301 checks whether a response from the web server 303 is received. If the web browser 301 confirms reception of the response from the web server 303 (YES in step S1402), then in step S1403, the web browser 301 checks the content of the received response.

If the response includes only a document (YES in step S1403) (step S1216 in FIG. 12), the processing proceeds to step S1404. In step S1404, the web browser 301 provides a preview of the document by displaying the received document on the display unit which is the output apparatus 206 of the client apparatus 101.

On the other hand, if the response includes the document and other data (NO in step S1403) (step S1217 in FIG. 12), then in step S1405, the web browser 301 displays the uploading screen 1110 included in the response on the display unit.

Next, in step S1406, the web browser 301 uploads the document to the cloud platform service 102 with using the CPSURL 906 and the upload program included in the uploading screen 1110 (step S1218 in FIG. 12).

Upon completion of the upload of the document, in step S1407, the web browser 301 displays the completion screen 1111 included in the response (step S1219 in FIG. 12). According to the above-described processing, the web browser 301 performs the document upload processing.

In the first exemplary embodiment, when the number of uploads that are currently being performed is equal to or larger than the maximum number of simultaneous uploads, the web server 303 immediately transmits the document to the web browser 301, and causes the web browser 301 to upload the document to the cloud platform service 102. As a second exemplary embodiment, a description will be given of a method in which, when the number of uploads that are currently being performed is equal to or larger than the maximum number of simultaneous uploads, the web server 303 does not immediately transmit the document to the web browser 301, and waits for a predetermined time. In the following, the contents already described for the first exemplary embodiment will not be described repeatedly.

Figure 15:
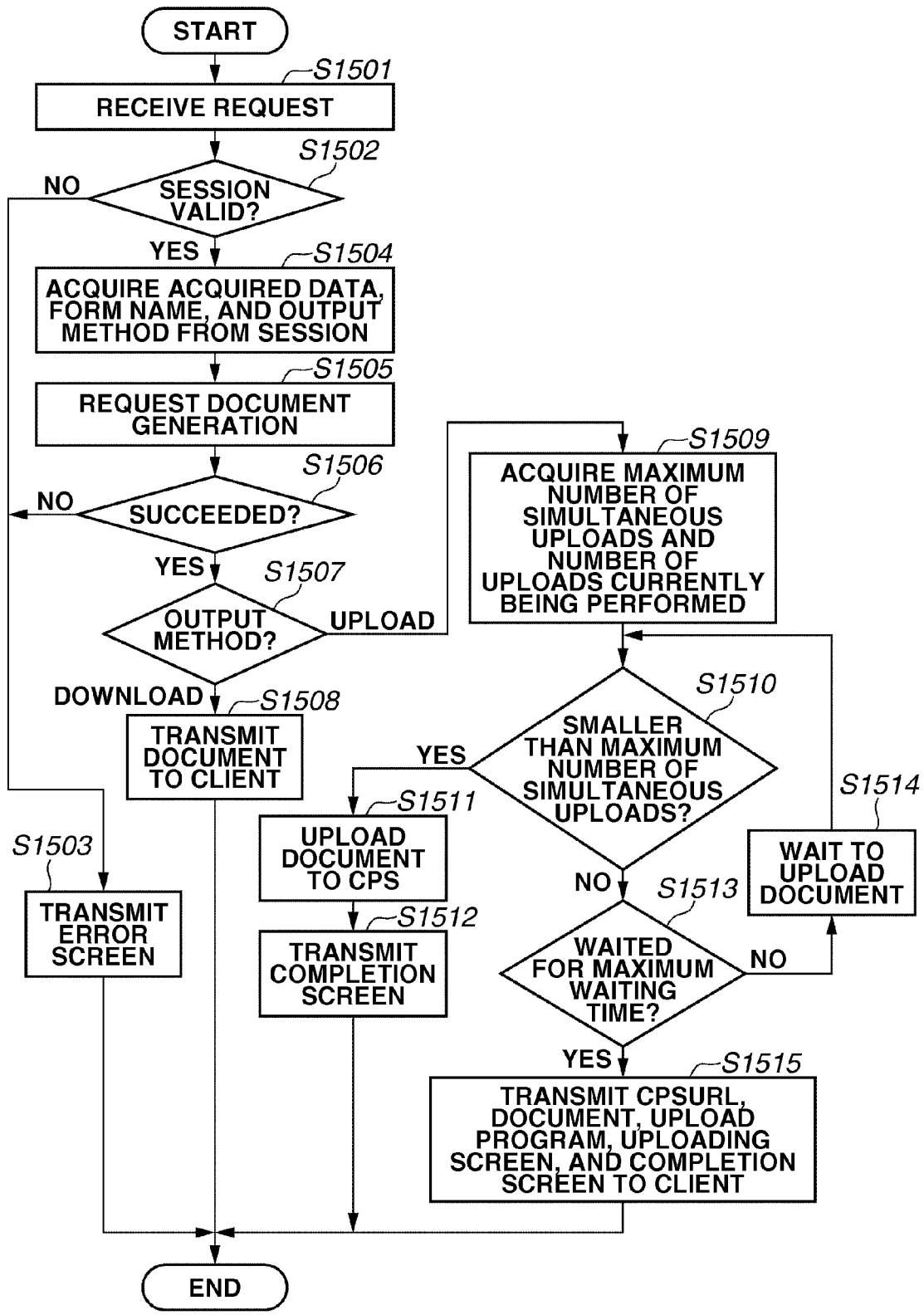
FIG. 15 is a flowchart illustrating an example of document generation processing performed by the web server according to a second exemplary embodiment, which corresponds to steps S1210 to S1217 illustrated in FIG. 12.

In the web server 303 illustrated in FIG. 5, the control unit 502 further stores a maximum waiting time. FIG. 15 is a flowchart illustrating an example of the document generation processing performed by the web server 303 according to the second exemplary embodiment, which corresponds to steps S1210 to S1217 illustrated in FIG. 12. The processing performed in steps S1501 to S1509 is the same as that in steps S1301 to S1309 illustrated in FIG. 13, respectively, and therefore the descriptions thereof will be omitted.

In step S1510, if the control unit 502 determines that the number of uploads that are currently being performed is equal to the maximum number of simultaneous uploads (NO in step S1510), then in step S1513, the control unit 502 checks a current waiting time.

If the waiting time is less than a predetermined maximum waiting time (NO in step S1513), then in step S1514, the control unit 502 waits for a predetermined time to upload the document. The time for which the control unit 502 waits in step S1514 may be any time as long as it is less than the maximum waiting time.

On the other hand, if the waiting time is equal to or more than the above-described maximum waiting time (YES in step S1513), the processing proceeds to step S1515. In step S1511, the control unit 502 acquires the document included in the response from the document generation service 304, the CPSURL 906, the uploading screen 1110, and the completion screen 1111. Further, the control unit 502 generates the upload program for enabling the web browser 301 to upload the document to the cloud platform service 102.

The CPSURL 906 and the thus generated upload program are embedded in the uploading screen 1110 as a program written in JavaScript interpretable and executable by the web browser 301.

Then, the control unit 502 transmits the document included in the response from the document generation service 304, the CPSURL 906, the uploading screen 1110, the completion screen 1111, and the upload program to the web browser 301 (step S1217 in FIG. 12).

On the other hand, in step S1510, if the control unit 502 determines that the number of uploads that are currently being performed simultaneously is smaller than the maximum number of simultaneous uploads (YES in step S1510), the control unit 502 performs the processing in step S1511. In step S1511, the control unit 502 acquires the document included in the response from the document generation service 304, and uploads the document to the cloud platform service 102 (step S1215 in FIG. 12).

Next, in step S1512, when a response indicating upload completion from the cloud platform service 102 is received, the control unit 502 requests the page generation unit 503 to generate the completion screen 1111. The page generation unit 503 generates the completion screen 1111, and the control unit 502 transmits the completion screen 1111 to the web browser 301 (step S1216 in FIG. 12).

The web server 303 may acquire the type of the client apparatus during a session with the web browser 301 and determines whether the web server 303 transmit a document to the web browser 301 according to the type of the client apparatus. The type of the client apparatus is, for example, a product name, a machine type, or a version of the client apparatus.

More specifically, for example, after the web server 303 determines NO in S1510, the web server 303 determines whether the client apparatus, which is a communicating destination, has a predetermined type having only a small capacity of a memory or the like. If the web server 303 determines that the type of the client apparatus, which is the communicating destination, is the predetermined type having only a small capacity of the memory, the processing proceeds to step S1513. On the other hand, if the web server 303 determines that the type of the client apparatus, which is the communicating destination, is not the predetermined type having only a small capacity of the memory, the processing proceeds to step S1515, in which the CPSURL 906, the document, the upload program, the uploading screen 1110, and the completion screen 1111 are transmitted to the client.

By providing such configuration, the memory use amount of the document generation server which is used in the document upload processing can be reduced without imposing a load to the client apparatus having only a small capacity of the memory.

According to the above-described exemplary embodiments, it is possible to reduce the memory use amount of the document generation server which is used in the document upload processing.

While the present invention has been described with the exemplary embodiments of the present invention based on specific examples, the present invention is not limited to the above-described exemplary embodiments. The present invention can also be realized by executing the following processing. More specifically, software (a program) for realizing the functions of the above exemplary embodiments is supplied to a system or an apparatus via a network or various storage media and a computer (or CPU or micro processing unit (MPU)) of the system or the apparatus reads and executes the program. In this case, the program and the storage media storing the program constitutes the present invention. In an example, a computer readable storage medium may store a program which, when run on a device, causes the device to execute a method described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-143063 filed Jun. 23, 2010, which is hereby incorporated by reference herein in its entirety.

What is claimed is:

1. A document generation apparatus capable of generating a document and uploading the generated document to an external service via a network, the document generation apparatus comprising:
    a processor coupled to a memory;
    a document generation unit configured to generate a document according to a document generation request from a client apparatus;
    an upload unit configured to upload the document to the external service;
    a transmission unit configured to transmit to the client apparatus;
    a determination unit configured to determine whether the document can be uploaded to the external service,
    wherein, when the determination unit determines that the document can be uploaded to the external service, the upload unit uploads the document from the document generation apparatus to the external service, and
    wherein, when the determination unit determines that the document cannot be uploaded to the external service, the transmission unit transmits, to the client apparatus, the document and information for uploading the document from the client apparatus to the external service to cause the client apparatus to upload the document to the external service,
    wherein the determination unit, the upload unit, and the transmission unit are stored in at least one memory;
    a storage unit configured to store a maximum number of simultaneous uploads to the external service that can be performed by the upload unit; and
    an acquisition unit configured to acquire, in response to reception of an instruction from the client apparatus to upload the document to the external service, the maximum number of simultaneous uploads stored in the storage unit and a number of uploads to the external service that are currently being performed,
    wherein the determination unit is configured to compare the number of uploads to the external service that are currently being performed and the maximum number of simultaneous uploads,
    wherein the determination unit determines that the document can be uploaded to the external service when the number of uploads to the external service that are currently being performed is smaller than the maximum number of simultaneous uploads, and
    wherein the determination unit determines that the document cannot be uploaded to the external service when the number of uploads to the external service that are currently being performed is not smaller than the maximum number of simultaneous uploads.

2. The document generation apparatus according to claim 1,
    wherein the determination unit is configured to compare a free memory amount of the document generation apparatus to a threshold value, and
    wherein the determination unit determines that the document can be uploaded to the external service when the free memory amount is equal to or more than the threshold value, and
    wherein the determination unit determines that the document cannot be uploaded to the external service when the free memory amount is less than the threshold value.

3. The document generation apparatus according to claim 1, further comprising a retention unit configured to retain a maximum waiting time for which the determination unit can repeatedly determine whether the document can be uploaded to the external service,
    wherein, when the determination unit determines that the document cannot be uploaded to the external service and a waiting time is equal to or longer than the maximum waiting time, the transmission unit transmits, to the client apparatus, the document and the information for uploading the document from the client apparatus to the external service to cause the client apparatus to upload the document to the external service.

4. The document generation apparatus according to claim 1, further comprising a generation unit configured to generate, when the determination unit determines that the document cannot be uploaded to the external service, an upload program to cause the client apparatus to upload the document to the external service,
    wherein the information for uploading the document to the external service that is transmitted to the client apparatus includes the upload program generated by the generation unit.

5. The document generation apparatus according to claim 1, wherein, in addition to transmitting the document and the information for uploading the document from the client apparatus to the external service, the transmission unit is configured to transmit, to the client apparatus, a screen to be displayed on a display unit of the client apparatus for indicating that upload processing of the document to the external service is currently being performed at the client apparatus.

6. A document generation system comprising:
  a document generation apparatus according to claim 1; and
  a client apparatus configured to request document generation, wherein the client apparatus includes a second upload unit configured to upload the document to the external service according the information for uploading, to the external service, the document received by the client apparatus from the document generation apparatus.

7. The document generation apparatus according to claim 1, wherein, when the determination unit determines that the document cannot be uploaded to the external service, the transmission unit immediately transmits, to the client apparatus, the document and information for uploading the document from the client apparatus to the external service.

8. The document generation apparatus according to claim 1, wherein, when the determination unit determines that the document cannot be uploaded to the external service, the transmission unit waits for a predetermined time to transmit, to the client apparatus, the document and information for uploading the document from the client apparatus to the external service.

9. A method for a document generation apparatus capable of generating a document and uploading the generated document to an external service via a network, the method comprising:
  generating a document according to a document generation request from a client apparatus;
  determining whether the document can be uploaded to the external service;
  uploading, when it is determined that the document can be uploaded to the external service, the document from the document generation apparatus to the external service;
  transmitting, when it is determined that the document cannot be uploaded to the external service, to the client apparatus, the document and information for uploading the document from the client apparatus to the external service to cause the client apparatus to upload the document to the external service;
  storing a maximum number of simultaneous uploads to the external service that can be performed; and
  acquiring, in response to reception of an instruction from the client apparatus to upload the document to the external service, the stored maximum number of simultaneous uploads and a number of uploads to the external service that are currently being performed,
  wherein determining includes comparing the number of uploads to the external service that are currently being performed and the maximum number of simultaneous uploads,
  wherein determining includes determining that the document can be uploaded to the external service when the number of uploads to the external service that are currently being performed is smaller than the maximum number of simultaneous uploads, and
  wherein determining includes determining that the document cannot be uploaded to the external service when the number of uploads to the external service that are currently being performed is not smaller than the maximum number of simultaneous uploads.

10. The method according to claim 9, wherein, when it is determined that the document cannot be uploaded to the external service, transmitting includes immediately transmitting, to the client apparatus, the document and information for uploading the document from the client apparatus to the external service.

11. The method according to claim 9, wherein, when it is determined that the document cannot be uploaded to the external service, transmitting includes waiting for a predetermined time to transmit, to the client apparatus, the document and information for uploading the document from the client apparatus to the external service.

12. A non-transitory computer readable storage medium storing a program which, when run on a document generation apparatus capable of generating a document and uploading the generated document to an external service via a network, causes the document generation apparatus to execute a method, the method comprising:
  generating a document according to a document generation request from a client apparatus;
  determining whether the document can be uploaded to the external service;
  uploading, when it is determined that the document can be uploaded to the external service, the document from the document generation apparatus to the external service;
  transmitting, when it is determined that the document cannot be uploaded to the external service, to the client apparatus, the document and information for uploading the document from the client apparatus to the external service to cause the client apparatus to upload the document to the external service;
  storing a maximum number of simultaneous uploads to the external service that can be performed; and
  acquiring, in response to reception of an instruction from the client apparatus to upload the document to the external service, the stored maximum number of simultaneous uploads and a number of uploads to the external service that are currently being performed,
  wherein determining includes comparing the number of uploads to the external service that are currently being performed and the maximum number of simultaneous uploads,
  wherein determining includes determining that the document can be uploaded to the external service when the number of uploads to the external service that are currently being performed is smaller than the maximum number of simultaneous uploads, and
  wherein determining includes determining that the document cannot be uploaded to the external service when the number of uploads to the external service that are currently being performed is not smaller than the maximum number of simultaneous uploads.

13. The non-transitory computer readable storage medium according to claim 12, wherein, when it is determined that the document cannot be uploaded to the external service, transmitting includes immediately transmitting, to the client apparatus, the document and information for uploading the document from the client apparatus to the external service.

14. The non-transitory computer readable storage medium according to claim 12, wherein, when it is determined that the document cannot be uploaded to the external service, transmitting includes waiting for a predetermined time to transmit, to the client apparatus, the document and information for uploading the document from the client apparatus to the external service.

* * * * *